(12) United States Patent
Olgaard et al.

(10) Patent No.: US 8,402,321 B2
(45) Date of Patent: Mar. 19, 2013

(54) SYSTEM AND METHOD OF PROVIDING DRIVER SOFTWARE TO TEST CONTROLLER TO FACILITATE TESTING BY WIRELESS TRANSCEIVER TESTER OF A DEVICE UNDER TEST

(75) Inventors: Christian Volf Olgaard, Saratoga, CA (US); Niels Vinggaard, Santa Clara, CA (US); Nabil Elserougi, San Jose, CA (US); Xiangdong Zhang, Fremont, CA (US); Mohan Bollapragada, Fremont, CA (US); John Lukez, Morgan Hill, CA (US); Benny Madsen, Los Altos, CA (US); Thomas Toldborg Andersen, Brentwood, CA (US)

(73) Assignee: LitePoint Corporation, Sunnyvale, CA (US)

( * ) Notice: Subject to any disclaimer, the term of this patent is extended or adjusted under 35 U.S.C. 154(b) by 316 days.

(21) Appl. No.: 12/819,383

(22) Filed: Jun. 21, 2010

(65) Prior Publication Data

US 2011/0314333 A1    Dec. 22, 2011

(51) Int. Cl.
   *G06F 11/00*    (2006.01)
(52) U.S. Cl. ......................................................... 714/43
(58) Field of Classification Search ...................... 714/43
   See application file for complete search history.

(56) References Cited

U.S. PATENT DOCUMENTS

| | | | |
|---|---|---|---|
| 4,833,676 A | 5/1989 | Koo | |
| 4,897,842 A | 1/1990 | Herz et al. | |
| 5,138,608 A | 8/1992 | Kucera et al. | |
| 5,910,977 A | 6/1999 | Torresgrossa | |
| 6,622,272 B1 * | 9/2003 | Haverkamp et al. | 714/725 |
| 6,753,693 B2 | 6/2004 | Seo et al. | |
| 6,870,392 B2 | 3/2005 | Kilian et al. | |
| 6,986,086 B2 | 1/2006 | Scholten | |
| 7,057,518 B2 | 6/2006 | Schmidt | |
| 7,406,641 B2 * | 7/2008 | Day | 714/727 |
| 7,463,140 B2 | 12/2008 | Schmidt | |
| 7,539,489 B1 * | 5/2009 | Alexander | 455/423 |
| 7,564,893 B2 | 7/2009 | O'Neill | |
| 7,890,822 B2 | 2/2011 | Behziz et al. | |
| 2006/0128373 A1 * | 6/2006 | Cochrane et al. | 455/424 |
| 2007/0109888 A1 * | 5/2007 | Baker | 365/201 |
| 2008/0026748 A1 * | 1/2008 | Alexander et al. | 455/432.1 |
| 2008/0209275 A1 * | 8/2008 | Kwan et al. | 714/38 |
| 2008/0282125 A1 * | 11/2008 | Hafeez et al. | 714/748 |
| 2008/0320345 A1 * | 12/2008 | Olgaard | 714/712 |
| 2009/0009184 A1 * | 1/2009 | Saeki | 324/537 |
| 2010/0213950 A1 * | 8/2010 | Liu et al. | 324/537 |
| 2011/0202799 A1 * | 8/2011 | Pagani | 714/27 |

OTHER PUBLICATIONS

PCT International Search Report and Written Opinion dated Dec. 7, 2011 for PCT/US2011/037706; 7 pages.

* cited by examiner

*Primary Examiner* — Kamini Patel

(57) ABSTRACT

A system and method of providing driver software to a test controller to facilitate testing by a wireless transceiver tester of a device under test (DUT). Using the wireless transceiver tester, executable tester instructions are accessed from one or more computer readable media and in accordance therewith bi-directional signal communications are established between the wireless transceiver tester and the test controller, and between the wireless transceiver tester and the DUT. Further accessed are executable driver instructions, including a plurality of executable driver program instructions for driving at least one of the wireless transceiver tester and the DUT, which are communicated to the test controller.

19 Claims, 2 Drawing Sheets

SYSTEM AND METHOD OF PROVIDING DRIVER SOFTWARE TO TEST CONTROLLER TO FACILITATE TESTING BY WIRELESS TRANSCEIVER TESTER OF A DEVICE UNDER TEST

BACKGROUND

1. Field of the Invention

The present invention relates to systems and methods for testing wireless transceivers, and in particular, such systems and methods in which the wireless transceiver tester and device under test (DUT) operate under the control of firmware for which the test controller and DUT require compatible device drivers.

2. Related Art

Many of today's handheld devices make use of wireless "connections" for telephony, digital data transfer, geographical positioning, and the like. Despite differences in frequency spectra, modulation methods, and spectral power densities, the wireless connectivity standards use synchronized data packets to transmit and receive data.

In general, all of these wireless-connectivity capabilities (e.g., WiFi, WiMAX, Bluetooth, etc.) are defined by industry-approved standards (e.g., IEEE 802.11 and IEEE 802.16) which specify the parameters and limits to which devices having those connectivity capabilities must adhere.

At any point along the device-development continuum, it is generally necessary to test and verify that a device is operating within its standards' specifications. Most such devices are transceivers, i.e., they transmit and receive wireless RF signals. Specialized systems designed for testing such devices typically contain subsystems designed to receive and analyze device-transmitted signals, and to send signals that subscribe to industry-approved standards so as to determine whether a device is receiving and processing the wireless signals in accordance with its standard.

The testing environment generally includes the device under test (DUT), the tester and a controller, e.g., a computer. The computer and tester work together to capture the DUT's transmitted signal and then analyze it against the specifications provided by the underlying standard; and to send tailored signals to the DUT to test its receiver capabilities against the specifications of the underlying standard.

To ensure that DUT, tester and computer cooperate accordingly, there needs to be a complementary relationship between the DUT hardware, tester firmware and drivers employed by the computer to coordinate DUT control and test sequencing. Currently, it is up to the user to figure out which driver goes with which version of firmware, and how best to obtain that driver. The drive to innovate and create more effective and efficient ways to test often involves new driver versions and concomitant development of new firmware. Although it would be convenient for new drivers to be backwards compatible with older versions of firmware, doing so would inhibit innovation. Thus, so long as tester innovation is a key objective, there will be a need to capture the innovation in new driver versions and to pair them up with complementary firmware.

There are three different factors that affect that complementary relationship: the firmware used in the tester, the driver needed to control the DUT, and the driver version used by the computer to control the tester. Any mismatch among the three can impair the testing process. However, imposing a backwards-compatibility restriction on new drivers would constrain innovation.

Test-system manufacturers specify the firmware and create the drivers for their systems. Similarly, chipset makers create drivers that enable integrated circuit (IC) control. Typically, the system user will download these drivers from appropriate websites to the computer. There may, however, be incompatibilities between firmware and driver. For example, the driver may be more recent and not fully complementary with the older firmware. In addition, there may be conflicts between the current version of an IC and different driver versions.

Referring to FIG. 1, a conventional test system environment 10 includes the DUT 12, the tester 14 and controller 16, interconnected substantially as shown. As is well known in the art, the tester 14 is typically implemented in the form of automated test equipment (ATE), such as a vector signal generator (VSG) and vector signal analyzer (VSA), which are well known in the art. Such test equipment 14 includes firmware 14a for controlling the automated test procedures performed by the tester 14.

The controller 16 is typically a computer, e.g., a personal computer (PC). The controller includes software 16a, e.g., its operating system (OS), one or more tester drivers 16b and one or more DUT drivers 16c. These drivers 16b, 16c can be implemented as software stored within or otherwise accessible to the controller 16, or resident in the form of firmware within or otherwise accessible to the controller 16. Such accessibility can include external memory or storage devices (not shown) directly connected to the controller 16 or accessible to the controller 16 by way of a data network (not shown).

The DUT 12 communicates with the tester via a communication link 13, which for testing purposes is a wired connection so as to ensure reliable signal communications between the DUT 12 and tester 14. The controller communicates with the DUT 12 via a communication link 11, e.g., for providing control signals to the DUT 12 and collecting data from the DUT 12. The controller also communicates with the tester via a communication link 15, e.g., for providing control signals to the tester 14 and receiving data from the tester 14. Also, this communication link 15 is used to transfer or update the firmware 14a within the tester 14 (discussed in more detail below).

These bi-directional communication links 11, 13, 15 can be in any of many conventional forms, such as Ethernet, universal serial bus (USB), or other types of which many are well known in the art.

As is well known, proper operation of the test system 10 requires that the tester firmware 14a, controller software 16a and the tester driver 16b be compatible, and further that the DUT 12 and DUT driver 16c are also compatible. Such compatibility among these components is critical, and is normally left to the user to identify and download the appropriate driver. Absent immediate or local availability of the drivers, e.g., on a CD-ROM available to the user, such drivers can be obtained via the Internet 20 from various websites. For example, the controller 16 will typically include a display and a graphic user interface (GUI) through which the user accesses the Internet 20, finds the appropriate one or more websites, and downloads the appropriate tester driver 26b and DUT driver 26c to replace, update or initially serve as the resident tester driver 16b and DUT driver 16c for use by the controller 16.

However, this procedure does not necessarily ensure that the drivers 26b, 26c that had been so located are, in fact, compatible with the DUT 12 and tester firmware 14a. Additionally, selection of the correct drivers can be confusing and prone to errors, particularly for inexperienced users of the test system 10.

Accordingly, it would be desirable to have a system and method to ensure compatibility among software and drivers used within a test system for wireless transceivers.

SUMMARY

In accordance with the presently claimed invention, a system and method are provided for providing driver software to a test controller to facilitate testing by a wireless transceiver tester of a device under test (DUT). Using the wireless transceiver tester, executable tester instructions are accessed from one or more computer readable media and in accordance therewith bi-directional signal communications are established between the wireless transceiver tester and the test controller, and between the wireless transceiver tester and the DUT. Further accessed are executable driver instructions, including a plurality of executable driver program instructions for driving at least one of the wireless transceiver tester and the DUT, which are communicated to the test controller.

In accordance with one embodiment of the presently claimed invention, a wireless transceiver tester operable to provide, to a test controller, driver software to facilitate testing by the wireless transceiver tester of a device under test (DUT) includes: first transceiver circuitry responsive to first one or more control signals by providing first bi-directional signal communications between a wireless transceiver tester and a test controller; second transceiver circuitry responsive to second one or more control signals by providing second bi-directional signal communications between the wireless transceiver tester and a DUT; and processor circuitry coupled to the first and second transceiver circuitries, operable to access a first portion of one or more computer readable media having a plurality of executable tester instructions and in accordance therewith provide the first and second one or more control signals, and further operable to access a second portion of the one or more computer readable media having a plurality of executable driver instructions. The plurality of executable driver instructions includes a plurality of executable driver program instructions for driving at least one of the wireless transceiver tester and the DUT, and the first transceiver circuitry is responsive to the first one or more control signals by communicating at least a portion of the plurality of executable driver program instructions to the test controller.

In accordance with another embodiment of the presently claimed invention, a method of providing driver software to a test controller to facilitate testing by a wireless transceiver tester of a device under test (DUT) includes: establishing first bi-directional signal communications between a wireless transceiver tester and a test controller; establishing second bi-directional signal communications between the wireless transceiver tester and a DUT; accessing a first portion of one or more computer readable media having a plurality of executable tester instructions and in accordance therewith controlling the establishing of the first and second bi-directional signal communications; accessing a second portion of the one or more computer readable media having a plurality of executable driver instructions including a plurality of executable driver program instructions for driving at least one of the wireless transceiver tester and the DUT; and communicating at least a portion of the plurality of executable driver program instructions to the test controller.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

Figure 1:
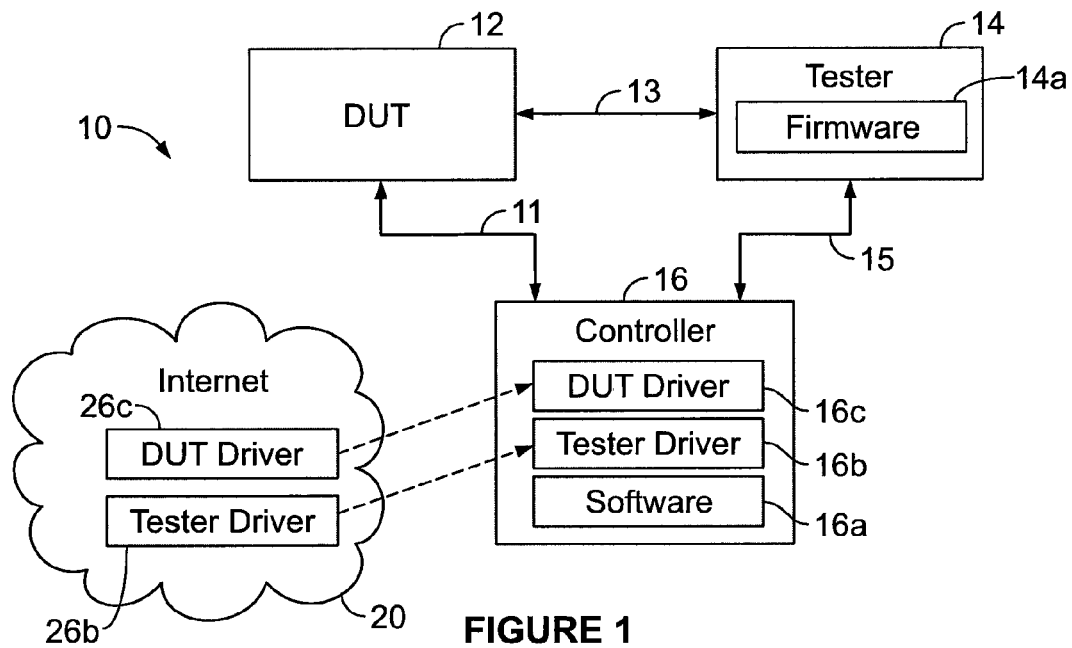
FIG. 1 depicts a conventional system for testing a wireless transceiver.
Figure 2:
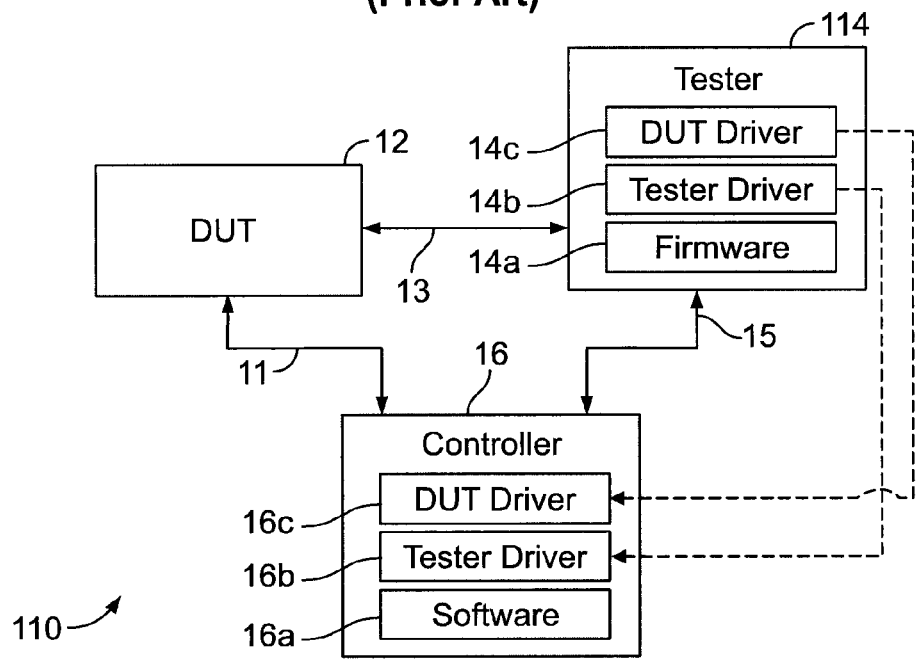
FIG. 2 depicts a system for testing a wireless transceiver in accordance with one embodiment with the presently claimed invention.

Referring to FIG. 2, a test system 110 in accordance with one embodiment of the presently claimed invention includes a tester 114 in which, in addition to its own firmware 14a, includes or otherwise has access to a compatible tester driver 14b and a DUT driver 14c compatible with the DUT 12. This makes the tester driver 14b, which is compatible with the tester firmware 14a, and appropriate DUT driver 14c available locally for transfer to or otherwise available for use by the controller 16 as its tester driver 16b and DUT driver 16c. This helps to ensure that the controller 16 will have the correct drivers whenever it uses this tester 114 to test the DUT 12.

In accordance with one embodiment, following initialization of the tester 114, a dynamic link library (DLL) can be transferred from the tester 114 to the controller 16, overwriting what was there previously. In accordance with another embodiment, communications between the controller 16 and tester 114 can be used to identify the current tester firmware 14a and access, e.g., transfer, the compatible tester driver 14b for use by the controller 16 as its tester driver 16b. Similarly, communications between the controller 16 and DUT 12 can be used to determine compatibility of the current DUT driver 16c and the DUT 12. In the event that they are not compatible, the controller 16 can then access, e.g., transfer, a compatible DUT driver 14c from the tester 114 for its use as its DUT driver 16c.

Further, in the event that there is a firmware update or revision for the tester 114, such new firmware 14a can be loaded into the tester 114, along with an updated or revised, as necessary, tester driver 14b and DUT driver 14c. Such a complete package of firmware and driver updates can ensure that the tester firmware 14a is always associated with a compatible tester driver 14b and appropriate DUT driver 14c, with little or not intervention or action on the part of the user. Additionally, it allows a single controller 16 to interact with multiple testers 114 with different firmware versions without concerns for locating or obtaining compatible tester 14b or DUT 14c drivers.

Figure 3:
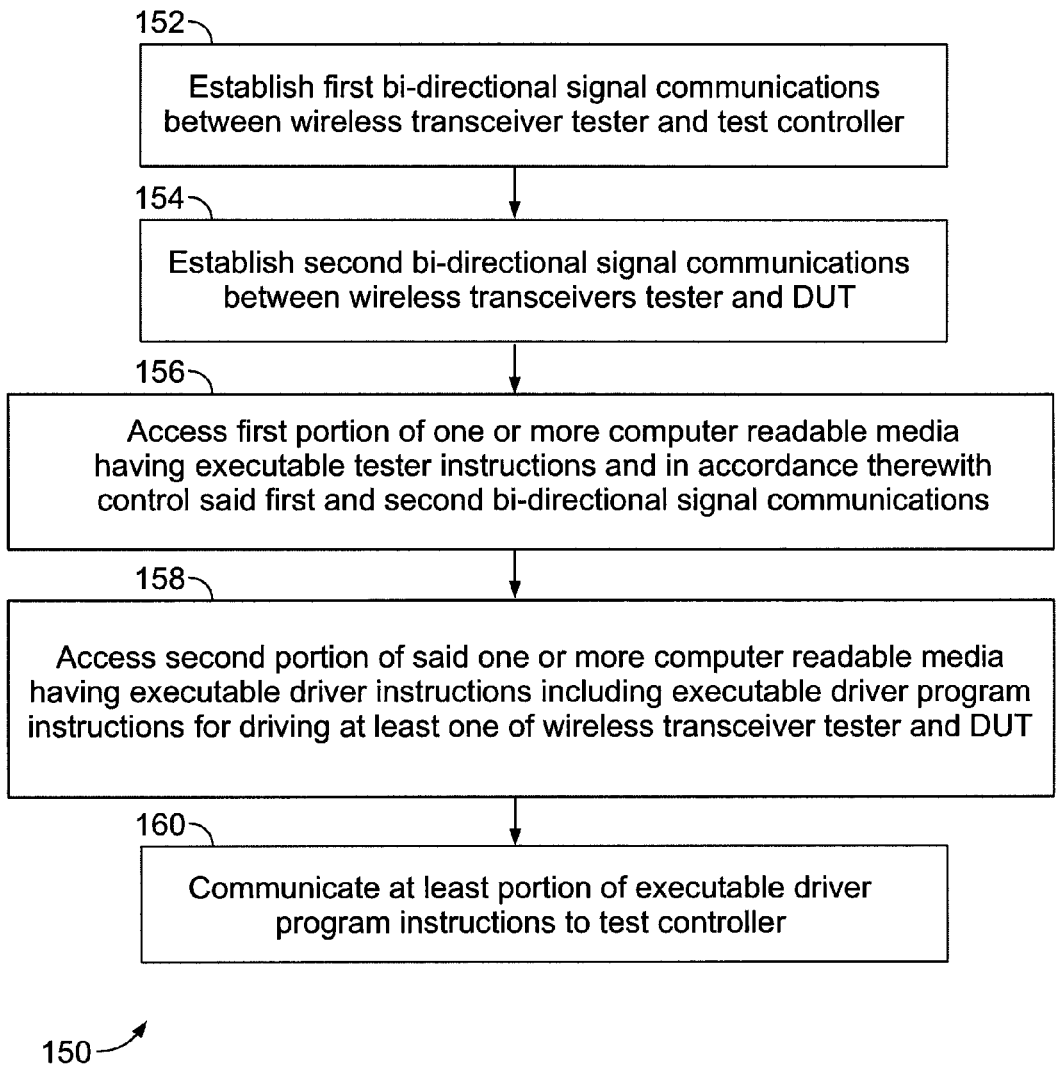
FIG. 3 depicts a method for testing a wireless transceiver in accordance with another embodiment of the presently claimed invention.

Referring to FIG. 3, a method 150 in accordance with another embodiment of the presently claimed invention can be practiced as follows. Initially, bi-directional signal communications are established 152 between the DUT 12 and controller 16, as well as bi-directional communications 154 between the tester 114 and DUT 12. Following that is accessing 156 a portion of one or more computer readable media having executable tester instructions and in accordance therewith controlling the bi-directional signal communications. Also accessed 158 is another portion of the one or more computer readable media having executable driver instructions including executable driver program instructions for driving at least one of the tester 114 and DUT 12. Following this, is communication 160 of at least a portion of the executable driver program instructions to the controller 16.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a wireless transceiver tester operable to provide, to a test controller, driver software to facilitate testing by said wireless transceiver tester of a device under test (DUT), comprising:
    first transceiver circuitry responsive to first one or more control signals by providing first bi-directional signal communications between a wireless transceiver tester and a test controller;
    second transceiver circuitry responsive to second one or more control signals by providing second bi-directional signal communications between said wireless transceiver tester and a DUT; and
    processor circuitry coupled to said first and second transceiver circuitries, operable to access a first portion of one or more computer readable media having a plurality of executable tester instructions and in accordance therewith provide said first and second one or more control signals, and further operable to access a second portion of said one or more computer readable media having a plurality of executable driver instructions;
    wherein
        said plurality of executable driver instructions includes a plurality of executable driver program instructions for driving at least one of said wireless transceiver tester and said DUT, and
        said first transceiver circuitry is responsive to said first one or more control signals by communicating at least a portion of said plurality of executable driver program instructions to said test controller when said at least a portion of said plurality of executable driver program instructions is incompatible with at least a portion of another plurality of executable driver program instructions currently accessible to said test controller.

2. The apparatus of claim 1, wherein said first transceiver circuitry communicates said plurality of executable tester driver program instructions to said test controller following an initiation of operation of said wireless transceiver tester.

3. The apparatus of claim 1, wherein:
    said at least a portion of said plurality of executable driver program instructions comprises a plurality of executable tester driver program instructions for driving said wireless transceiver tester; and
    said first transceiver circuitry is responsive to said first one or more control signals by communicating said plurality of executable tester driver program instructions to said test controller following one of said first bi-directional signal communications.

4. The apparatus of claim 3, wherein said first transceiver circuitry communicates said plurality of executable tester driver program instructions to said test controller when said one of said first bi-directional signal communications is indicative of an incompatibility between said plurality of executable tester instructions and another plurality of executable tester driver program instructions currently accessible to said test controller.

5. The apparatus of claim 1, wherein said first transceiver circuitry communicates said plurality of executable DUT driver program instructions to said test controller following an initiation of operation of said wireless transceiver tester.

6. The apparatus of claim 1, wherein:
    said at least a portion of said plurality of executable driver program instructions comprises a plurality of executable DUT driver program instructions for driving said DUT; and
    said first transceiver circuitry is responsive to said second one or more control signals by communicating said plurality of executable DUT driver program instructions to said test controller following one of said first bi-directional signal communications.

7. The apparatus of claim 6, wherein:
    one of said second bi-directional signal communications is indicative of a plurality of executable DUT instructions accessible to said DUT; and
    said first transceiver circuitry communicates said plurality of executable DUT driver program instructions to said test controller when said one of said second bi-directional signal communications is indicative of an incompatibility between said plurality of executable DUT instructions and another plurality of executable DUT driver program instructions currently accessible to said test controller.

8. The apparatus of claim 1, wherein said first transceiver circuitry comprises radio frequency (RF) transceiver circuitry.

9. The apparatus of claim 1, wherein said second transceiver circuitry comprises digital networking communications circuitry.

10. The apparatus of claim 1, further comprising said one or more computer readable media.

11. A method of providing driver software to a test controller to facilitate testing by a wireless transceiver tester of a device under test (DUT), comprising:
- establishing first bi-directional signal communications between a wireless transceiver tester and a test controller;
- establishing second bi-directional signal communications between said wireless transceiver tester and a DUT;
- accessing a first portion of one or more computer readable media having a plurality of executable tester instructions and in accordance therewith controlling said establishing of said first and second bi-directional signal communications;
- accessing a second portion of said one or more computer readable media having a plurality of executable driver instructions including a plurality of executable driver program instructions for driving at least one of said wireless transceiver tester and said DUT; and
- communicating at least a portion of said plurality of executable driver program instructions to said test controller when said at least a portion of said plurality of executable driver program instructions is incompatible with at least a portion of another plurality of executable driver program instructions currently accessible to said test controller.

12. The method of claim 11, wherein said communicating at least a portion of said plurality of executable driver program instructions to said test controller comprises communicating said at least a portion of said plurality of executable driver program instructions to said test controller following an initiation of operation of said wireless transceiver tester.

13. The method of claim 11, wherein:
- said at least a portion of said plurality of executable driver program instructions comprises a plurality of executable tester driver program instructions for driving said wireless transceiver tester; and
- said communicating at least a portion of said plurality of executable driver program instructions to said test controller comprises communicating said plurality of executable tester driver program instructions to said test controller following one of said first bi-directional signal communications.

14. The method of claim 13, wherein said communicating at least a portion of said plurality of executable driver program instructions to said test controller comprises communicating said plurality of executable tester driver program instructions to said test controller when said one of said first bi-directional signal communications is indicative of an incompatibility between said plurality of executable tester instructions and another plurality of executable tester driver program instructions currently accessible to said test controller.

15. The method of claim 11, wherein said communicating at least a portion of said plurality of executable driver program instructions to said test controller comprises communicating said plurality of executable DUT driver program instructions to said test controller following an initiation of operation of said wireless transceiver tester.

16. The method of claim 11, wherein:
- said at least a portion of said plurality of executable driver program instructions comprises a plurality of executable DUT driver program instructions for driving said DUT; and
- said communicating at least a portion of said plurality of executable driver program instructions to said test controller comprises communicating said plurality of executable DUT driver program instructions to said test controller following one of said first bi-directional signal communications.

17. The method of claim 16, wherein:
- one of said second bi-directional signal communications is indicative of a plurality of executable DUT instructions accessible to said DUT; and
- said communicating at least a portion of said plurality of executable driver program instructions to said test controller comprises communicating said plurality of executable DUT driver program instructions to said test controller when said one of said second bi-directional signal communications is indicative of an incompatibility between said plurality of executable DUT instructions and another plurality of executable DUT driver program instructions currently accessible to said test controller.

18. The method of claim 11, wherein said establishing first bi-directional signal communications between a wireless transceiver tester and a test controller comprises establishing bi-directional radio frequency (RF) signal communications.

19. The method of claim 11, wherein said establishing second bi-directional signal communications between said wireless transceiver tester and a DUT comprises establishing bi-directional digital networking signal communications.

* * * * *